United States Patent
Widerhorn et al.

(10) Patent No.: US 12,462,152 B2
(45) Date of Patent: *Nov. 4, 2025

(54) APPLIED ARTIFICIAL INTELLIGENCE TECHNOLOGY FOR PROCESSING TRADE DATA TO DETECT PATTERNS INDICATIVE OF POTENTIAL TRADE SPOOFING

(71) Applicant: TRADING TECHNOLOGIES INTERNATIONAL INC., Chicago, IL (US)

(72) Inventors: David I. Widerhorn, Phoenix, AZ (US); Paul Giedraitis, Chicago, IL (US); Melanie Rubino, Indianapolis, IN (US); Carolyn Phillips, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 923 days.

This patent is subject to a terminal disclaimer.

(21) Appl. No.: 16/731,421

(22) Filed: Dec. 31, 2019

(65) Prior Publication Data

US 2020/0151565 A1    May 14, 2020

Related U.S. Application Data

(63) Continuation of application No. 15/294,044, filed on Oct. 14, 2016, now Pat. No. 10,552,735.

(Continued)

(51) Int. Cl.
*G06N 3/08* (2023.01)
*G06N 3/004* (2023.01)
*G06N 3/04* (2023.01)

(52) U.S. Cl.
CPC .............. *G06N 3/08* (2013.01); *G06N 3/004* (2013.01)

(58) Field of Classification Search
CPC .......... G06N 3/08; G06N 3/004; G06N 20/00; G06Q 10/04; G06Q 40/04
See application file for complete search history.

(56) References Cited

U.S. PATENT DOCUMENTS

2004/0098485 A1* 5/2004 Larson .................... H04L 45/24
                                                                709/227
2005/0055399 A1   3/2005 Savchuk
                         (Continued)

OTHER PUBLICATIONS

'Fair Value Accounting and Financial Stability': Enria 2004, Occasional Paper Series No. 1 3.*

(Continued)

*Primary Examiner* — Van C Mang
(74) *Attorney, Agent, or Firm* — McDonnell Boehnen Hulbert & Berghoff LLP

(57) ABSTRACT

Various techniques are described for using machine-learning artificial intelligence to improve how trading data can be processed to detect improper trading behaviors such as trade spoofing. In an example embodiment, semi-supervised machine learning is applied to positively labeled and unlabeled training data to develop a classification model that distinguishes between trading behavior likely to qualify as trade spoofing and trading behavior not likely to qualify as trade spoofing. Also, clustering techniques can be employed to segment larger sets of training data and trading data into bursts of trading activities that are to be assessed for potential trade spoofing status.

20 Claims, 9 Drawing Sheets

Related U.S. Application Data

(60) Provisional application No. 62/307,108, filed on Mar. 11, 2016, provisional application No. 62/250,470, filed on Nov. 3, 2015, provisional application No. 62/241,751, filed on Oct. 14, 2015.

(56) References Cited

U.S. PATENT DOCUMENTS

| | | | |
|---|---|---|---|
| 2012/0254333 A1* | 10/2012 | Chandramouli | G06F 40/10 709/206 |
| 2013/0097246 A1* | 4/2013 | Zifroni | H04W 4/029 709/204 |
| 2013/0304903 A1* | 11/2013 | Mick | G06F 9/44 709/224 |
| 2015/0033305 A1* | 1/2015 | Shear | G06F 21/53 726/11 |
| 2015/0081505 A1* | 3/2015 | Co | G06Q 40/04 705/37 |
| 2017/0004576 A1* | 1/2017 | Cicero | G06Q 40/04 |
| 2020/0090278 A1* | 3/2020 | Christensen | G06Q 40/04 |

OTHER PUBLICATIONS

'Detecting Price Manipulation in the Financial Market' Cao, 2014, IEEE, 2380-8454.*
'Microstructure-based manipulation: Strategic behavior and performance of spoofing traders': Lee, 2013, Elsevier Journal of Financial Markets 16 (2013) 227 252.*
'Learning from Positive and Unlabeled Examples with Different Data Distributions': Li, 2005, Springer, European conference on machine learning.*
'Distributed Denial of Services Attack Protection System with Genetic Algorithms on Hadoop Cluster Computing Framework': Mizukoshi, 2015, IEEE, 978-1-4799-7492.*
'Data Stream Clustering for Online Anomaly Detection in Cloud Applications' IEEE, 978-1-4673-9289, 2015 11th European Dependable Computing Conference (Year: 2015).*
Volatility Clustering in Financial Markets: Empirical Facts and Agent-Based Models; Cont Springer (Year: 2007).*
Biondo, J., and Trinkaus, M. "Make Surveillance Smarter and Eliminate Blind Spots with TT Score," Trade Talk Blog, Trading Technologies, Jan. 18, 2018, retrieved from the Internet at: https://www.tradingtechnologies.com/blog/2018/01/18/make-surveillance-smarter-and-eliminate-blind-spots-with-tt-score/.
Biondo, J., and Trinkaus, M. "Supercharge Your Spoofing Surveillance with TT Score," Trade Talk Blog, Trading Technologies, Feb. 14, 2018, retrieved from the Internet at: https://www.tradingtechnologies.com/blog/2018/02/14/supercharge-your-spoofing-surveillance-with-tt-score/.
Cao, Y., Detecting Price Manipulation in the Financial Market, Mar. 28, 2014 Computational Intelligence for Financial Engineering & Economics (CIFEr), 2014 IEEE.
Complaint of U.S. Commodity Futures Trading Commission in Case 1:15-cv-09196, filed Oct. 19, 2015.
Complaint of U.S. Commodity Futures Trading Commission in Case 1:15-cv-09196, Exhibit A, filed Oct. 19, 2015.
Crichlow, 'An Introduction to Distributed and Parallel Computing', Prentice Hall, 1988.
Irisium Market Surveillance, Cinnober, retrieved from the Internet on Apr. 23, 2018: https://www.cinnober.com/solutions/irisium-market-surveillance.
Li, Xiao-Li, and Liu, Bing, "Learning from Positive and Unlabeled Examples with Different Data Distributions," Department of Computer Science, University of Illinois at Chicago.
Liu, et al. at the URL www.cs.uic.edu/-liub/NSF/PSC-IIS-0307239.html as "Learning from Positive and Unlabeled Examples" {see also Bing Liu, Yang Dai, Xiaoli Li, Wee Sun Lee and Philip Yu. "Building Text Classifiers Using Positive and Unlabeled Examples." Proceedings of the Third IEEE International Conference on Data Mining ICDM-03), Melbourne, Florida, Nov. 19-22, 2003.
Liu, et al. "Building Text Classifiers Using Positive and Unlabeled Examples," Department of Computer Science, University of Illinois at Chicago.
Russell, S., 'Artificial Intelligence a Modern Approach', Pearson Education, 2003.
Satran, R., "Spoofing or Just Fast Trading? Chicago Case Helps Unwrap Mystery," Financial Regulatory Forum, Reuters, Nov. 19, 2015, retrieved from the Internet at: http://blogs.reuters.com/financial-regulatory-forum/2015/11/19/spoofing-or-just-fast-trading-chicago-case-helps-unwrap-mystery/.
SMARTS Trade Surveillance System, Surveillance Solutions, NASDAQ, retrieved from the Internet on Apr. 23, 2018: http://business.nasdaq.com/market-tech/market-participants/SMARTS-trade-surveillance-sell-side.
Trade Surveillance Software System, Trillium Surveyor, retrieved from the Internet on Apr. 23, 2018: https://www.trlm.com/surveyor/.

* cited by examiner

Example List of Fields for File Format of Trade Event Messages

1. Transaction Timestamp
2. Trader or User ID
3. Source System Name or Identifier
4. Client Order ID (or ISV Order ID)
5. Exchange Order ID
6. Account Number
7. Buy Sell Code
8. Order Type (e.g., Market, Limit, Stop, Stop Limit...)
9. Order Quantity
10. Fill Quantity
11. Leaves or Remaining Quantity (optional)
12. Limit Price
13. Stop Price
14. Fill Price
15. Security Type (e.g., Future, Option, Stock, ...)
16. Exchange
17. Symbol
18. Maturity Month Year
19. Put or Call
20. Strike Price
21. Time in Force
22. Execution ID
23. Order Status (e.g., New, Canceled, Filled, Part Filled, ...)
24. Transaction ID

Figure 2

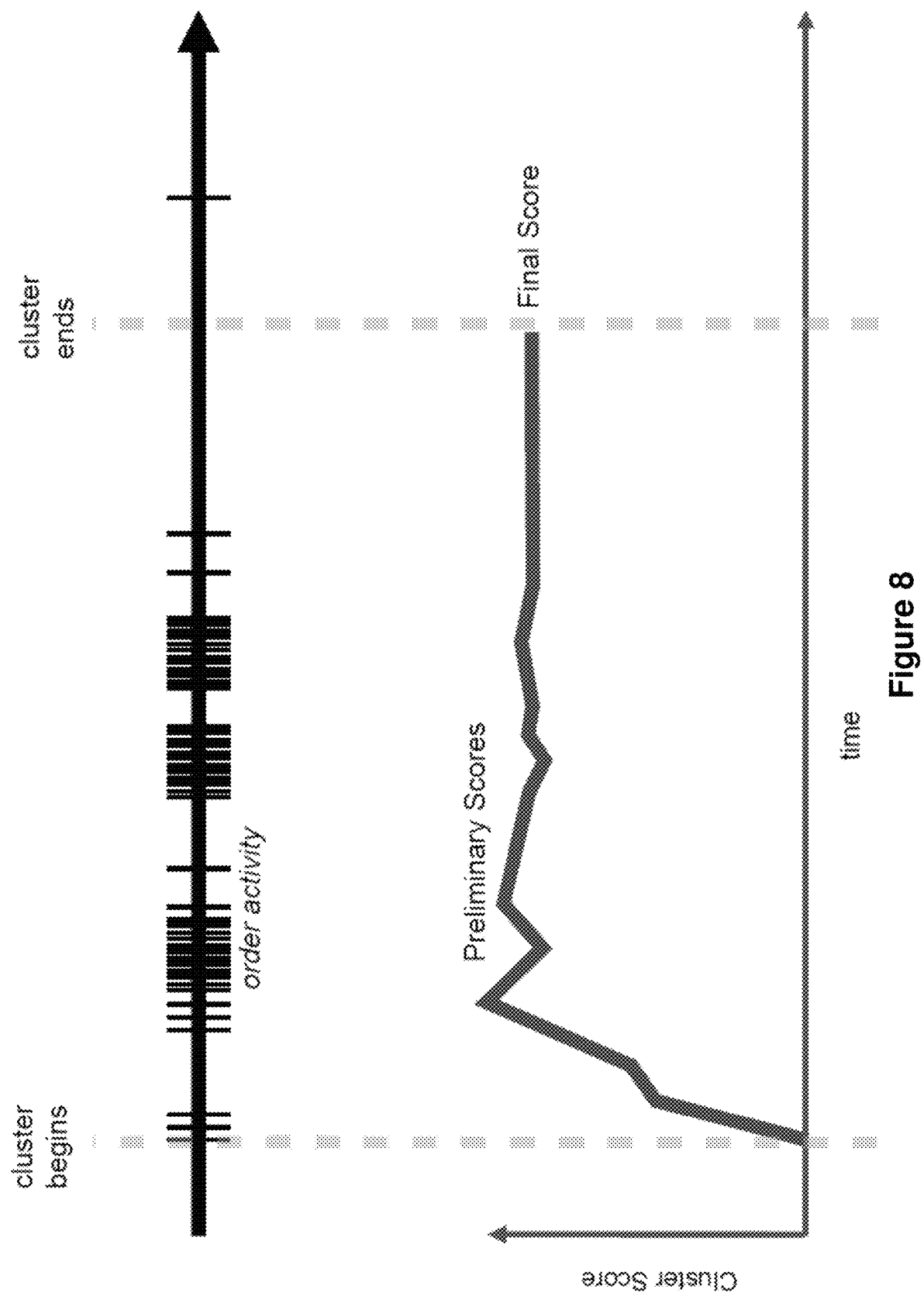

APPLIED ARTIFICIAL INTELLIGENCE TECHNOLOGY FOR PROCESSING TRADE DATA TO DETECT PATTERNS INDICATIVE OF POTENTIAL TRADE SPOOFING

CROSS-REFERENCE TO RELATED APPLICATIONS

This application is a continuation of U.S. patent application Ser. No. 15/294,044, filed Oct. 14, 2014, which claims priority to U.S. Provisional Application Ser. No. 62/241,751, filed Oct. 14, 2015, and entitled "Market Surveillance System". U.S. patent application Ser. No. 15/294,044 also claims priority to U.S. Provisional Patent Application Ser. No. 62/250,470, filed Nov. 3, 2015, and entitled "Trading Analysis and Visualization Tool". U.S. patent application Ser. No. 15/294,044 also claims priority to U.S. Provisional Application Ser. No. 62/307,108, filed Mar. 11, 2016, and entitled "Trading Activity Visualizations Within Market Data Streams". The entire contents of each of the above-referenced applications are incorporated herein by reference for all purposes.

INTRODUCTION

Trading exchanges provide a location for buyers and sellers to trade stocks, bonds, currencies, commodities, and other items. The New York Stock Exchange and the Chicago Mercantile Exchange are examples of such trading exchanges.

Electronic trading exchange systems facilitate rapid electronic trading of tens to hundreds of millions of securities in seconds or fractions of a second, and thus open up opportunities for traders to capitalize on quick changes in securities prices across a plethora of financial markets. However, with these benefits come challenges of making sure that traders and customers of a trading firm stay fully compliant with current market regulations that govern electronic trading. Failure to monitor compliance can be extremely costly to the trading firm. The cost can take the form of having to participate in Commodity Futures Trading Commission (CFTC) investigations and audit procedures, as well as having to pay actual direct financial and legal penalties if the government chooses to leverage fines or pursue direct regulatory enforcement action.

Governmental rules regarding acceptable trading activity versus prohibited conduct are often not clearly understood by market participants, nor by the companies that serve them. While these regulations regarding acceptable trading activity versus prohibited trading activity are difficult to understand, they are harshly enforced. This discongruity is particularly problematic when it comes to taking preventative measures against trading activities difficult to quantify and evaluate. As a result, rapid and accurate detection of prohibited market practices has become of paramount importance to all businesses within the trading industry (and the futures industry in particular). The workload of finding instances of market manipulation that might be present within the large dataset of trading activity conducted by a trading firm requires a great deal of analysis and other tedious work that tie up a significant amount of time and internal company resources. Therefore, there exists within the industry a need for analysis and detection mechanisms capable of evaluating large quantities of trading activity and determining to a degree of certainty whether such trading activity is considered active market manipulation.

An example of market manipulation governed by the CFTC lies in active participation of a market trader attempting to outpace other market participants and manipulate the commodities market to their own personal advantage. Such activity is generally referred to as "spoofing" or "trade spoofing" within the financial industry. A classic example of trade spoofing would occur when a trader loads up an order book for a financial instrument with large volumes of orders (e.g., buy orders) that he has no intent of executing in an effort to manipulate the price for the financial instrument (e.g., by increasing the supply of buy orders relative to sell orders, the financial instrument price can be expected to rise due to the relative oversupply of buyers relative to sellers). The trader may then place a sell order designed to profit from the manipulated increase in the sell price. Subsequently the trader cancels the large volume of buy orders never intended to be executed. However, it should be understood that sophisticated traders may formulate spoofing trading strategies that are very hard to detect.

Rule 575 of the CFTC, adopted by the CME, CBOT, NYMEX and COMEX, makes it illegal to engage in practices commonly known as "spoofing" and "stuffing." Such trading activity involves traders that either (a) deliberately place and then modify or cancel orders with the intent of avoiding execution and thus misleading other market participants, or (b) that place large volumes of orders with the intent of overloading or delaying the system and disrupting execution flow. The actual text of Rule 575 reads as follows:

All orders must be entered for the purpose of executing bona fide transactions. Additionally, all non-actionable messages must be entered in good faith for legitimate purposes.

No person shall enter or cause to be entered an order with the intent, at the time of order entry, to cancel the order before execution or to modify the order to avoid execution;

No person shall enter or cause to be entered an actionable or non-actionable message or messages with intent to mislead other market participants;

No person shall enter or cause to be entered an actionable or non-actionable message or messages with intent to overload, delay, or disrupt the systems of the Exchange or other market participants; and No person shall enter or cause to be entered an actionable or non-actionable message with intent to disrupt, or with reckless disregard for the adverse impact on, the orderly conduct of trading or the fair execution of transactions.

For trading activities to qualify as prohibited behavior such as spoofing, the trader must exhibit "intent." The inherent subjectiveness of "intent" makes it difficult for trading firms to monitor compliance with financial regulations. This places a burden on compliance staff at trading exchanges and clearing firms to determine the applicability of such a provision to a particular or series of market activities executed by a trader. Both regulators and compliance staff are forced to rapidly make decisions based upon available trading and inquiry data, but how to best process the available data is a non-trivial and time consuming task. Regardless, numerous penalties due to violations of Rule 575 have still been leveraged by the CFTC, by the CME, and by the U.S. Attorney's Office in criminal proceedings despite the difficulty in monitoring compliance.

To ease the burden on the regulators and compliance officers, a handful of products have been developed to solve these issues by automating the surveillance process through the use of software tools. These tools may detect a trade activity or a series of trading activities which may or may not be indicative of a market manipulation action. Currently available detection solutions tend to take a catch-all, blanketed approach to detecting and identifying disruptive market practices. For example, a typical strategy for existing tools is to implement long lists of quick-turn, threshold-based rule metrics and apply them to newly available data in brute-force fashion.

The available detection solutions pose a number of problems each to the compliance user, traders, and to the underlying architectural design of the software used in these solutions. Compliance staff has the burden of choosing alert threshold values or other arbitrary configuration settings for each of many dozens of surveillance metrics. The resulting output for a given surveillance period is the generation of many thousands of so-called "alerts"—i.e. processed sequences of trades that violate the prescribed thresholds of each metric. Because there is little guidance for users to select input parameters, inaccuracies are commonly found within the detection results. If the parameters are too loose or too tight, the detection results will miss trading violations, may issue false positives for acceptable trading activities, or both. Essentially, these detection results are impossible to interpret in any meaningful way. Thus, the conventional approach to computer-based detection of spoofing relies on rule sets that produce noisy results in terms of overwhelming numbers of false positives and undue amounts of false negatives.

Additionally, currently available detection solutions cannot be reasonably relied upon to produce the nuanced results needed in each individual market. The complexity and diversity of individual markets and trade market data reporting platforms makes it generally ineffective to apply one choice of parameters across all market platforms, products, and strategies. Parameters useful to flag manipulative market behavior within one market or exchange may be completely incompatible and effectively useless in evaluating another market or a different exchange. Furthermore, employing these current detection solutions within trading firms leads to heavy deployment costs. The setup and configuration of the currently available solutions create an extremely complex interconnected network. This leads to an extremely labor intensive launch and coordination effort by the trading firm among several large committees or expensive professional services. The large costs associated with these heavy deployment metrics present a large financial obligation to trading firms attempting to remain in compliance.

Finally, the greatest drawback of the currently available detection solutions lies in the fact that these solutions are implemented based on the workflow of the trading firm employing the solution. Thus, the detection solutions are configured and set to fit the size and the capacity of the department tasked with reviewing trade alerts, and not based on an assessment of the validity of the results. For example, the choice of parameters and thresholds for generating alerts are primarily decided based upon the capacity of each customer's available compliance workforce to review the number of sequences generated, not based upon a real sense of what appropriately constitutes the underlying behavior being investigated. In many ways this methodology leaves much of the process to chance.

Therefore, recognizing the limitations present with current detection solutions available to trading firms, the inventors sought out an inventive solution to improve not only the detection and analysis of problematic trading events, but also a solution operable to fix and obviate the deficiencies of the currently employed detection solutions. As indicated above, there is a technical problem in the art where existing computer systems are not capable of analyzing rich data sets to find suspicious data patterns due to significant amounts of "noise" in those data sets. As a technical innovation that improves how computers operate in order to solve this technical problem, the inventors have developed a machine learning artificial intelligence capable of reflecting the nuanced trading mechanics traders take and regulators observe when a trading activity is executed. Such an innovative surveillance approach allows for the inventor's system to recognize trading patterns indicative of trading actions which are likely to draw regulatory attention. Thus, the compliance officers and regulators are easily able to address whether these trading actions fail the compliance standards set for by the CFTC or are trading actions indicative of disruptive market activity.

In an example embodiment, the inventors disclose a method and corresponding system of applied artificial intelligence where a computer system (1) applies machine-learning artificial intelligence to training data in order to train a classification model for assessing whether trading data is indicative of trade spoofing in a financial market, the training data comprising positively labeled training data, the positively labeled training data comprising a plurality of clusters of trading data that are classified as indicative of trade spoofing in a financial market, and (2) in response to the application of the machine-learning artificial intelligence to the training data, the computer system creates a data structure that represents the trained classification model. A processor can then process trading data using the trained classification model data structure in order determine a spoofing classification status for the processed trading data, the spoofing classification status being indicative of a likelihood that the processed trading data describes trade spoofing in a financial market.

In another example embodiment, the inventors disclose a method and corresponding system of applied artificial intelligence where a processor (1) groups trading data that comprises a plurality of trade events with respect to a financial instrument in a financial market into a plurality of trading clusters, each trading cluster comprising data representative of a plurality of the trade events and serving as an unclassified trade spoofing candidate, (2) for each trading cluster, computes a plurality of features that represent the trading clusters, (3) processes the computed features for each trading cluster against a classification model data structure that has been trained to classify trading clusters as to whether they are indicative of trade spoofing in a financial market, and (4) based on the processing, assigns a trading spoofing classification status to each of a plurality of the trading clusters, each assigned trading spoofing classification status being indicative of a likelihood that its corresponding trading cluster represents trade spoofing in a financial market.

In yet another example embodiment, the inventors disclose a method and corresponding system of applied artificial intelligence where a computer system (1) applies semi-supervised iterative machine-learning artificial intelligence to positively labeled training data and unlabeled training data in order to generate a plurality of trained classification models for assessing whether trading data is indicative of trade spoofing in a financial market, (2) computes a plurality of metrics that describe how the trained classification models perform when labeling unlabeled training data, (3) selects a trained classification model from among the plurality of trained classification models based on the computed metrics, and (4) creates a data structure that represents the selected trained classification model, the data structure for use by an execution system to facilitate classification of unclassified trading data as to whether such unclassified trading data is indicative of trade spoofing in a financial market.

Further features and advantages of the disclosed embodiments, as well as the structure and operation of various elements of the disclosed embodiments, are described in detail below with reference to the accompanying drawings.

BRIEF DESCRIPTION OF THE DRAWINGS

The accompanying drawings, which are incorporated in and form a part of the specification, illustrate the disclosed embodiments and together with the description, serve to explain certain inventive principles. In the drawings:

FIG. 2 illustrates a sample set of fields in a trade event message.

FIG. 8 illustrates how clustering can be performed in real-time to support real-time running computations of classification scores and risk scores.

DETAILED DESCRIPTION OF EXAMPLE EMBODIMENTS

Figure 1:
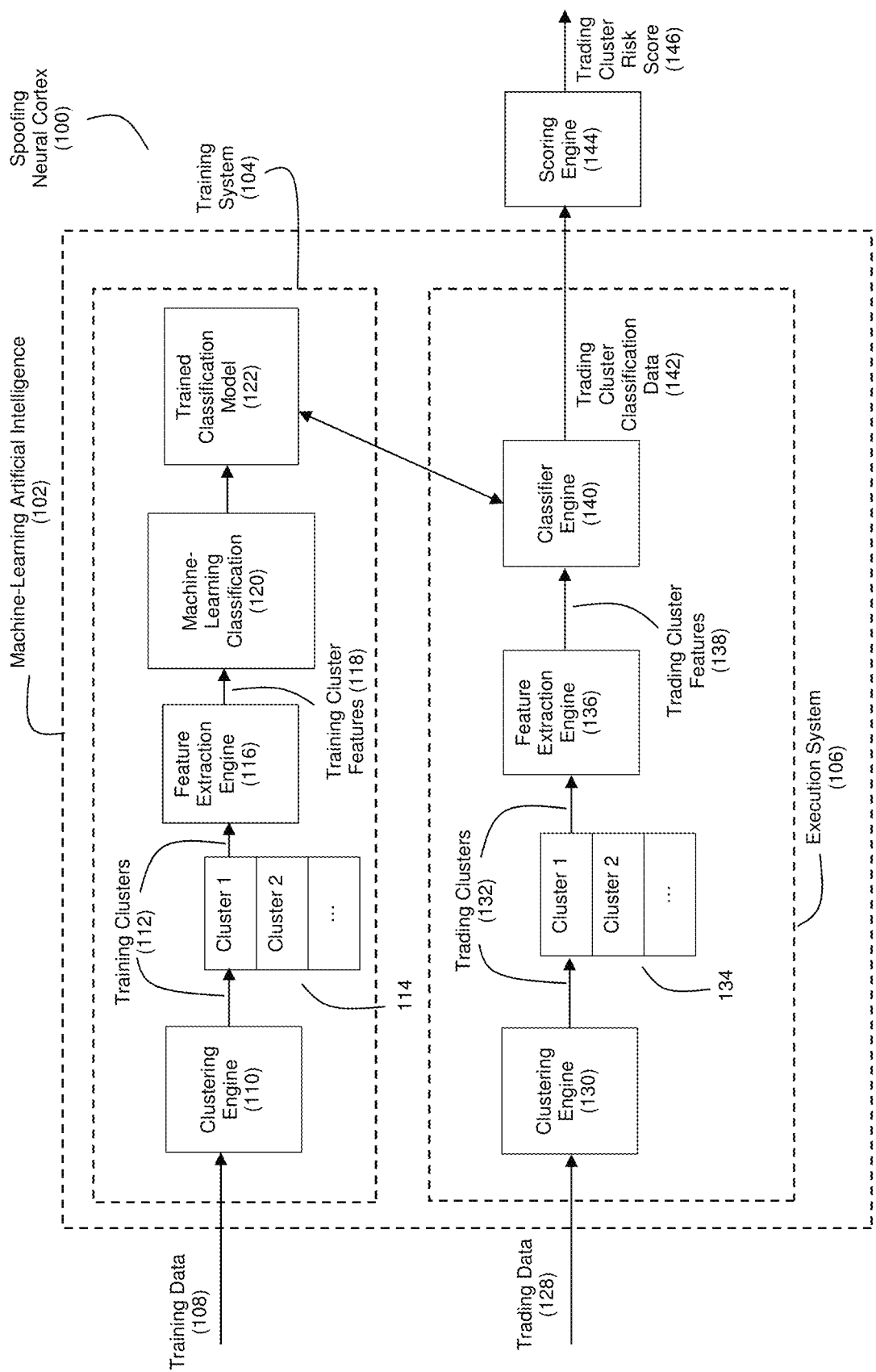
FIG. 1 illustrates a system diagram of an example embodiment of a spoofing neural cortex.

Referring to the accompanying drawings in which like reference numbers indicate like elements, FIG. 1 illustrates an example of a specially-configured computer system that can be referred to as a spoofing neural cortex 100. The spoofing neural cortex 100 includes machine learning artificial intelligence 102 that is configured to quantify a likelihood that a given set of trading data exhibits patterns of trading behavior that qualify as trading spoofing in a financial market. The use of machine-learning artificial intelligence 102 by the computer system represents a significant technical improvement over conventional rule-based market surveillance systems. Not only is the machine-learning artificial intelligence 102 expected to produce better results in terms of more accurate spoofing assessments of trading data (e.g., fewer false positives, fewer false negatives), but perhaps more importantly, the machine-learning artificial intelligence 102 is highly amenable to adapting itself to new forms of spoofing behavior by traders. It is expected that trade spoofing will exhibit an evolving nature that requires cat-and-mouse efforts by auditors and regulators to adjust detection capabilities in view of new spoofing patterns used by traders. Under prior rules-based detection systems, adaptation to new patterns of spoofing had required devising and coding new rules for use by a detection system which involved significant programming efforts while still suffering from the high rates of false positives and false negatives as discussed above. By contrast, the training mechanism of machine-learning artificial intelligence 102 provides a graceful capability for adjusting to evolving patterns of trade spoofing without a need for significant re-coding of the system. By re-training the machine-learning artificial intelligence 102 as new training data becomes available, the inventive system is highly scalable for adapting to new patterns of prohibited trading behavior.

The machine-learning artificial intelligence 102 includes a training system 104 and an execution system 106. The training system 104 iteratively processes training data 108 to compute a trained classification model 122 for use by the execution system 106. The execution system 106 then processes trading data 128 to classify that trading data based on the trained classification model 122 to formulate a classification indicative of a likelihood that the processed trading data represents trade spoofing. It should be understood that the training system 104 and execution system 106 can be deployed on one or more computing machines. Thus, in an example embodiment, a first processor (or set of processors) can execute code to serve as the training system 104 while a second processor (or set of processors) can execute code to serve as the execution system 106. These processors can be deployed in computer systems that communicate with each other via a network, where the training system 104 communicates a data structure representing the trained classification model 122 over the network to the execution system 106. Further still, these networked computer systems can be operated by different entities. Thus, the training system 104 can be operated by a first party that serves as the "master" or "expert" with respect to the development of a well-tuned classification model, while one or more execution systems 106 operated by different trading firms (or other entities with a need for detecting potential trade spoofing activities) can access this classification model when testing trading data for potential spoofing behavior. However, it should also be understood that in another example embodiment, the same processor (or set of processors) can execute code for both the training system 104 and execution system 106.

The various engines described herein for the spoofing neural cortex 100 can be deployed as executable code or instructions resident on a non-transitory computer-readable storage medium such as computer memory that is cooperation with one or more processors. The processors can execute the code representing the engines as needed during operation of the training system 104 and execution system 106.

The trading data 128 can take the form of a sequence of trade event messages relating to one or more financial instruments in one or more financial markets. For purposes of discussion, we will assume that the trading data 128 comprises a sequence of trade events for a given financial instrument (e.g., Product X) in a given financial market. The trade event messages can be derived from audit log data that maintains records of all trade event messages generated by traders in a trading firm. The trade event messages can also be a real-time stream of trade event messages generated by traders for submission to financial market exchanges. The trade event messages correspond to trade events such as (1) the placing of orders (referred to as "places"), (2) the cancellation of orders (referred to as "cancels"), (3) partial fills of placed orders, (4) full fills of placed orders, and (5) modifications of placed orders. The trade event messages include a plurality of fields, including fields such as (1) a time stamp that identifies when the trade event message was generated, (2) a trader ID that identifies the trader for the trade event, (3) an order ID that identifies the order to which the trade event pertains, (4) a symbol that identifies the financial instrument that is the subject of the trade event, (5)

a position ID that identifies whether the trade order is a buy or sell order, (6) an order quantity, etc. FIG. 2 shows an example list of fields that may be included in the trade event messages with within trading data 128. The training data 108 may include similar information fields.

It should also be noted that the system may pre-process the trading data 128 and training data 108 to normalize the data within the trading data 128/training data 108 to a common format regardless of the source for such data. Different firms and exchanges may employ different formats for trade event messages, and pre-processing operations (not shown in FIG. 1) may be used to convert such data to a common format. For example, the value in a price field in Message A may be encoded using a first format while the value in a price field in Message B may be encoded using a different format. Similarly, financial instrument symbols for the same financial instrument products may be encoded differently depending upon the systems involved. So that the spoofing neural cortex 100 can perform "apples to apples" processing, normalization pre-processing can be employed to ensure that the trading data 128 and training data 108 exhibits a common format regardless of the source for such data.

Another innovative aspect of the example embodiment of FIG. 1 is the application of clustering to segment trading data into subgroups of trading data for evaluation as to potential trade spoofing status. By segmenting the trader data for evaluation, a large data set is divided into analyzable units of work that can be assessed independently for patterns of manipulation and distributed over multiple processors if desired by a practitioner. These subgroups can be referred to as trading clusters 132, and they represent a group of trade events that are deemed to be contextually and collectively relevant when reviewed together to assess potential trade spoofing. Clusters may be thought of as "packets of intent" because each cluster may include a group of trade events (e.g., placing, modifying, or cancelling an order) that collectively demonstrate the intention of an actor such as a trader to achieve a goal in a market. This goal may be very simple (such as exiting a position as quickly as possible at market price) or it may involve a more complex trading strategy (such as gradually accumulating a particular position in a certain instrument at a target price over a desired time period, while profiting from smaller fluctuations in price along the way based upon momentum or other market indicators). As explained below, a variety of clustering techniques can be formed to generate these trading clusters.

As noted above, the training system 104 can employ machine-learning to process sets of training data 108 in order to train a classification model 122 to distinguish between spoofing and non-spoofing behavior. The training data 108 may take the form of a sequence of trade events, and any of a plurality of machine-learning techniques can be used by the training system 104 to train the classification model 122 from this training data 108. For example, the training system 104 could employ supervised, unsupervised, or semi-supervised machine-learning. In a supervised or semi-supervised machine-learning model, the training data 108 is labeled as to whether such training data 108 is deemed to qualify as an instance of trade spoofing. Training data 108 may come from a variety of sources. For example, a regulating authority may provide examples of trade events that it considers to qualify as trade spoofing. As another example, a practitioner may devise a series of theoretical trade event sequences that are deemed to qualify as trade spoofing. As yet another example, a feedback mechanism might be employed where trading data found by the execution system 106 to be highly indicative of trade spoofing might get fed back to the training system 104 for use as training data 108. Such examples of sequences of trade events can be positively labeled as spoof trading and used by training system 104 to train the model 122.

A practitioner might also choose to employ negatively labeled training data 108 to train the classification model 122, in which case the machine-learning can employ a supervised learning model that is trained based on positive examples of trade spoofing and negative examples of trading spoofing. However, the inventors note that negative examples of trade spoofing may not be widely available. As such, in another example embodiment, the machine-learning can employ a semi-supervised learning model that is trained based on both (1) sequences of trade events that are positively labeled as being trade spoofing, and (2) sequences of trade events that are unlabeled as to whether or not they qualify as trade spoofing. Example embodiments of such machine-learning based on positively labeled and unlabeled training data 108 are discussed below.

Furthermore, as new training data 108 becomes available, the training system 104 can use this new training data 108 to further train the classification model 122 to improve its discriminatory capabilities. Thus, it is expected that the spoofing neural cortex 100 will improve over time in its ability to appropriately classify trading data as to whether it represents trade spoofing behavior.

Training data 108 may originate from various sources, examples of which may include a firm, customers of a firm, traders, groups of traders, a regulatory agency such as the Commodity Futures Trading Commission (CFTC), the Securities and Exchange Commission (SEC), the National Futures Association (NFA), etc. and/or an exchange such as the Chicago Mercantile Exchange (CME), the New York Mercantile Exchange (NYMEX), the Intercontinental Exchange (ICE), etc. Other examples of training data may include publicly available market data, and order books associated with market trades or market traders.

Clustering

Figure 3A:
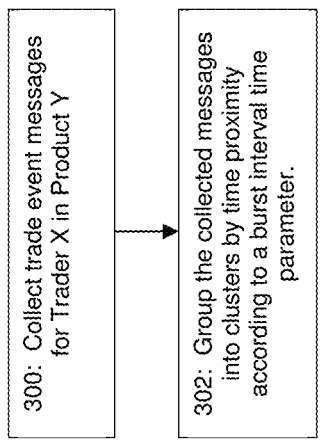
FIGS. 3A-D illustrates various clustering embodiments for use by a spoofing neural cortex.
Figure 3B:
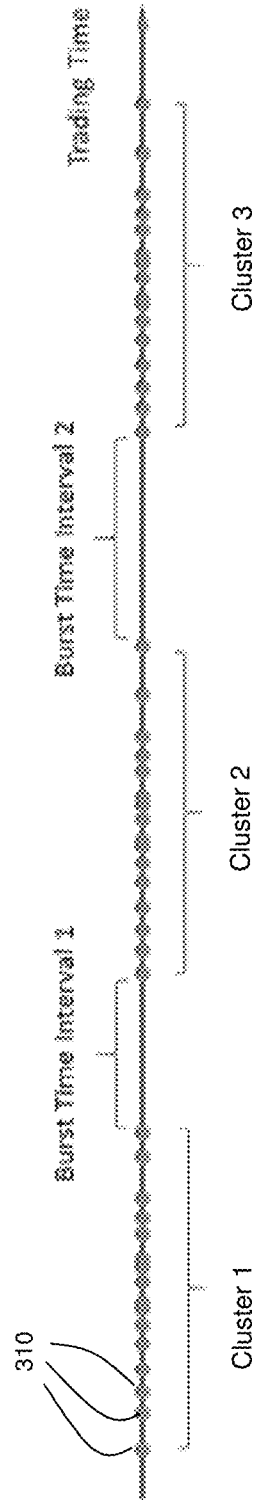
Figure 3C:
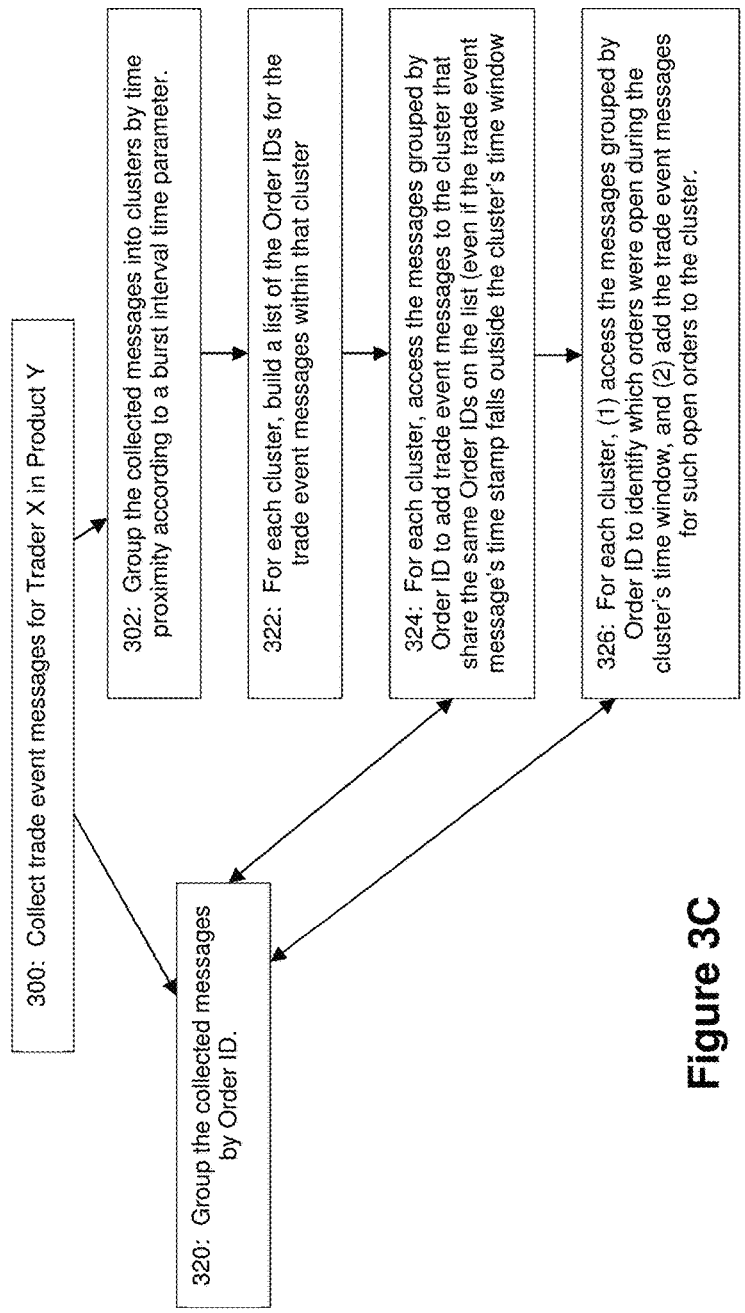

The system can perform clustering on training data 108 and trading data 128 via clustering engines 110 and 130 respectively. Trade events can be grouped into clusters based on any of a number of criteria. FIG. 3A shows an example clustering process flow where time-stamped trade events are clustered based on time boundaries. FIG. 3C shows another example clustering process flow where time-stamped trade events are clustered based on both time boundaries and aspects of the trade events other than time boundaries.

In the example of FIG. 3A, at step 300, the trade event messages for a defined trader with respect to a defined financial instrument product are collected by the clustering engine. It should be understood that these constraints on the collection at step 300 are exemplary only; for example the collection need not be limited to single traders or to single financial instruments. For example, a group of traders may be colluding to manipulate a market via spoofing. As such, it may be desirable for step 300 to operate by collecting trade event messages for a group of traders. Similarly, in some instances, actions taken with respect to a first financial instrument may cause an impact on pricing for a second financial instrument. Thus, it is conceivable that a trader or group of traders might spoof trades in Financial Instrument A in order to manipulate the price of Financial Instrument B and profit from such price manipulation. Thus, it may also be desirable for step 300 to operate by collecting trade event messages relating to multiple financial instruments. However, for simplicity of explanation, the clustering process will be described for a single trader with respect to a single product.

At step 302, the clustering engine groups the collected messages into clusters by time proximity according to a burst interval time parameter. This burst interval time parameter will define how far apart consecutive trade event messages must be to be segmented into different clusters. Thus, where the times between consecutive trade event messages are all less than the burst interval time, these trade event messages are grouped into the same cluster. A new cluster is started whenever the time between two consecutive trade event messages exceeds the burst interval time (in which case the later of the two consecutive trade event messages would become the first trade event message in the new cluster). FIG. 3B depicts an example that shows how a series of time-stamped trade event messages 310 may be grouped into clusters according to a burst interval time parameter.

A practitioner may choose a value for the burst interval time parameter according to any desired criteria. In general, choosing a value for the burst time interval parameter that is too small may result in the formation of clusters that do not capture sufficient data, which may detract from detection performance. Similarly, choosing a value for the burst time interval parameter that is too high may result in the formation of clusters that capture too much data, which may also detract from detection performance. In an example embodiment, the burst interval time parameter may be a static value that is pre-determined based on a statistical analysis of the trading data as well as their linear combination. In another example embodiment, the burst interval time parameter may be dynamic value that varies based on metrics such as a number of trades and/or a value of financial instruments being traded (e.g., money flow). For instance, as the number of trades and/or money flow increases, the burst interval time may be decreased to optimally segment the faster trading activity. On the other hand, as the market data rate and/or money flow decreases, the burst interval time may be increased to optimally segment the slower trading activity. The determination of a value for the burst time interval may be performed daily or based on some other interval. Also, in an example embodiment, the clustering engine 110 and clustering engine 130 employ the same burst interval time parameters as each other, although this need not be the case.

In the example of FIG. 3C, the clusters are formed not only on the basis of time considerations but also on the basis of other criteria. In this example, the clusters will also include (1) trade event messages that are related to the same Order ID as a trade event message in the time series cluster, and (2) trade event messages that are related to an order that was open during the time window defined by the time series cluster. In FIG. 3C, steps 300 and 302 can operate as they did for FIG. 3A such that a number of time series clusters are formed from collected trade event messages.

At step 320, the clustering engine groups the collected trade event messages by Order ID (e.g., where Group 1 includes all of the collected trade event messages that share Order ID 1, where Group 2 includes all of the collected trade event messages that share Order ID 2, and so on). These groupings can then serve as a mechanism for the clustering engine to identify additional trade event messages that are to be added to the time series clusters.

At step 322, for each time series cluster formed at step 302, the clustering engine builds a list of the Order IDs for the trade event messages within those clusters. Thus, for Cluster 1 (which includes Trade Event Messages A, B, C, . . . ), step 322 will generate a list in association with Cluster 1 that identifies the Order IDs from Trade Event Messages A, B, C, . . . The same would occur for Cluster 2, Cluster 3, and so on.

Next, at step 324, the clustering engine, for each time series cluster, accesses the groups formed at step 320 to find all trade event messages that share the same Order ID as any of the Order IDs on the list generated at step 322 for that time series cluster. The clustering engine adds these trade event messages that share the same Order ID as an Order ID on the list to the subject time series cluster (even though that trade event message falls outside the cluster's time window). Thus, each cluster is augmented with additional trade event data that is related to an order that was the subject of a trade event within the cluster's time window.

Figure 3D:
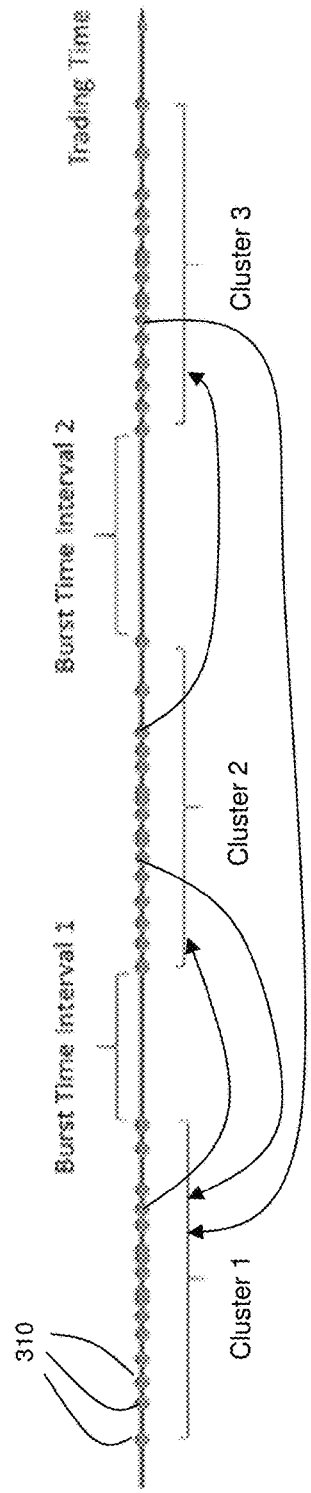

At step 326, the clustering engine, for each time series cluster, accesses the groups formed at step 320 to find all trade event messages that are associated with orders that were open during the time window defined by the subject time series cluster. The determination as to which orders were open during the time period can be reached based on data fields within the trade event messages for a given Order ID. The clustering engine then adds the trade event messages that are associated with orders that were open during the time window defined by the subject time series cluster to the time series cluster. Thus, at the conclusion of step 324, final clusters can be formed that include not only the trade event messages based on time proximity but also the trade event messages added to the clusters via steps 324 and 326. FIG. 3D depicts an example that shows how a series of time-stamped trade event messages 310 that are grouped into clusters according to a burst interval time parameter may be augmented with related trade event messages that fall outside the cluster time windows.

In an example embodiment, the clustering process of FIG. 3C can employ a one-to-one mapping between a trade event message and a cluster, such that each trade event message is only assigned to one particular cluster; however this need not be the case. Thus, a trade event message whose timestamp places it within Cluster 2 can be re-assigned to Cluster 1 as a result of step 324 or step 326 can be either removed from Cluster 2 or retained in Cluster 2 depending on the desires of a practitioner.

Also, if desired by a practitioner, the clustering engine may discard clusters that do not meet a defined set of minimal characteristics. For example, clusters that include less than a threshold number of trade event messages might be discarded. Similarly, clusters that include only fill events might be discarded.

The training and trading clusters 112 and 132 respectively that are generated by clustering engines 110 and 130 respectively may be stored in buffers 114 and 134 respectively while they await feature extraction, as discussed below.

It should also be understood that clustering engine 110 may be omitted if the training data 108 happened to already be pre-clustered. But, in the event that it is desirable to cluster the training data 108 so as to effectively train the classification model 122, clustering engine 110 can operate as discussed above. However, the training clusters 112 may differ from the trading clusters 132 in that each training cluster 112 may be associated with a label indicative of its spoofing classification (e.g., a positively labeled training cluster, an unlabeled training cluster, or a negatively labeled training cluster). Thus, for a set of training data 108 that is positively labeled, the clustering engine 110 may be configured to automatically assign the positive label to each training cluster 112 derived from that set of positively labeled training data 108. However, the inventors note that it in order to improve performance, it may be desirable for a spoofing expert to review each training cluster 112 derived from a positively labeled set of training data 108 to selectively identify which of those training clusters should be assigned a positive label. It may be the case that the positively labeled training data 108 includes various windows of trade activity that do not constitute trade spoofing, and the performance of the model 122 may be improved by not assigning a positive label to such training clusters.

Also, as discussed above, it may be the case the spoofing activities are conducted by multiple traders and/or with respect to multiple financial instruments. To detect such spoofing activities, the clustering engine 130 may also be configured to form "superclusters" from various combinations of the clusters formed as a result of the process flows of FIGS. 3A and 3C. Thus, the "superclusters" can be higher-level groups of individual clusters that may reflect related trading activity associated with a common strategy. Each cluster within a supercluster may by itself not be indicative of possible prohibited trading activity, but the trading activity described by the supercluster might be indicative of possible prohibited trading activity.

For example, the clustering engine 130 may be configured to identify apparent relationships between different clusters of trading data (e.g., to identify collusion-driven or intent-based manipulation) such as a relationship between the trading data of two different traders in the same product market or a relationship between the trading activity of a given trader in two different product markets, using statistical and/or machine-learning techniques. The clustering engine 130 may cycle through various different combinations of clusters to assess a likelihood of collaboration exhibited by the two or more clusters. The clusters may be combined to form a supercluster.

Various other more complex approaches may be used to identify and form superclusters.

In one example, an "Intraday Position Approach" may be used to identify when significant changes in position have occurred during a day. Each change in position may be identified as a cluster. The clusters of different changes in position may represent related trading activity associated with a common strategy. The different clusters may form a supercluster.

In another example, an "Order Size Aggregation Approach" may be used to monitor cumulative order sizes over time. For example, if a trader's "aggregated intended position" exceeds a certain threshold (or rate of change), then the time when this occurs could be used to divide a time series of trading data into two clusters, i.e. those occurring before the time and those occurring after. The clusters of different order sizes may represent related trading activity associated with a common strategy. The different clusters may form a supercluster.

In yet another example, a "Profit Analysis Approach" may identify certain changes in profit or loss (notional or actual). A cluster before and after the change may be identified as separate clusters. The clusters of changes in profit and loss may represent related trading activity associated with a common strategy. The different clusters may form a supercluster.

In another example, a "Directional Fills Approach" may be used to perform fill events followed by changes in the direction (buy versus sell) of trading data before the fill event and after the fill event, as "cluster boundaries" i.e. timestamps that define a barrier between two sets of orders (before and after) that belong in different clusters. The clusters of fill events, buy, and sell may represent related trading activity associated with a common strategy. The different clusters may form a supercluster.

In yet another example, a "Market Quality Context Approach" may be used to identify clusters with certain market quality metrics/indicators associated with clusters. For example, a trader may be trading crude oil futures and shifted his strategy based upon major events going on in the crude oil market—that shift in strategy could be determined by analyzing the overall market through quality indicators. Clusters with certain common indicators may be combined to form a supercluster.

In another example, a "Trading Style Pattern Recognition Approach" may be used to recognize certain strategy types (i.e. "momentum" versus "mean reversion" versus "market making" versus "auto-spreading") as well as technology types ("point-and-click" versus "high frequency"/"direct market access" etc.). Clusters associated with the certain strategy types and/or technology types may be combined to form a supercluster.

In this regard, it should be understood that the trading clusters 132 produced by clustering engine 130 may include superclusters of trading data.

Further still, it should be understood that the clustering engine 130 may also ingest additional data relating to the trading data 128, such as a trader's email and phone records, social media relationship graphs, banking and financial records, or the like. This information could also be used by the clustering engine 130 in the process for identifying the clusters and/or the process for identifying relationships between different sets of trading data for purposes of super-clustering.

The clustering process may also be configured with different levels of resolution that affect how much trading data is included with each cluster. In a high resolution example, each cluster may include a high density of data to permit the calculation of a rich feature set by the feature extraction engine (discussed below). However, this will increase the computational burden on the system. In some situations, it may be desirable for the clusters to exhibit lower resolution by including less trading or other data in each cluster.

Feature Extraction

The system can perform feature extraction on training clusters 112 and trading clusters 132 via feature extraction engines 116 and 136 respectively. Thus, each cluster can be represented for purposes of spoofing evaluation as a vector of feature values. It is preferred that the same set of features be computed by the feature extraction engine 116 for the training clusters 112 as are computed by the feature extraction engine 136 for the trading clusters 116.

A practitioner of the invention can select any of a number or combination of features that the practitioner believes will be helpful for assessing whether a cluster of trading data constitutes trade spoofing. Examples of features that can be computed for the clusters in this regard are include various comparative ratios (examples discussed below), measures of trader book imbalance (e.g., asymmetry between buy and sell side open order volume), measures of frequent change in imbalance direction, measures of concealing open interest from the visible market (e.g., icebergs), measures of rapid addition or removal of order volume at the top of the book, and market context. Market context is information associated with the cluster such as types of financial instruments being traded, historical prices of the financial asset being traded, and/or amount of activity in a market associated with the cluster. The market context may span when a cluster is present or some other window of time.

Examples comparative ratios that can be computed as cluster features by the feature extraction engines include the number of total orders placed versus number of total orders filled, in a cluster, for a specific trader and contract type. The comparative ratios associated with non-compliant behavior may be significantly higher than the comparative ratios in the case of ordinary trading activity. In this regard, comparative ratios may be used by the spoofing neural cortex 100 in an effort to identify trading activity likely to attract regulatory attention.

The comparative ratios may fall into the following four general categories which are further described below:
1) Ratio of Average Order Size (AOS) of non-filled orders to Average Order Size of filled orders (same size and opposing side).
2) Ratio of Average Order Size of Filled (OSF) orders versus Average Order Size of Non-Filled orders calculated including and excluding pro-rata versus first-in-queue products.
3) Ratio of the following two ratios: (a) the ratio of orders Placed versus Cancelled, to (b) the ratio of orders Placed versus Filled, calculated for same side and opposing side (PCF).
4) Gross Ratio of Filled (GRF) versus non-filled orders.

The Non-Filled Average Order Size Ratios (AOS) category may include four sub-metrics that calculate the ratio of Average Order Size of non-filled orders to that of filled orders in both buy and sell sides. Filled orders may be financial orders which have been satisfied, e.g., a buyer and seller agree on a price. Non-filled orders may be financial orders which have not been satisfied, e.g., a buyer and seller have not agreed on a price.
1) Average Order Size of Non-Filled vs Filled orders (BUY)
2) Average Order Size of Non-Filled vs Filled orders (SELL)
3) Average Order Size of Non-Filled orders (BUY) vs Filled orders (SELL)
4) Average Order Size of Non-Filled orders (SELL) vs Filled orders (BUY)

The Filled Order Size Ratios (OSF) category includes four different sub-metrics that calculate the ratio of the total number of filled orders to non-filled orders in both buy and sell sides.
1) Total Filled vs Non-Filled orders (BUY)
2) Total Filled vs Non-Filled order (SELL)
3) Total Filled orders (BUY) vs Non-filled orders (SELL)
4) Total Filled orders (SELL) vs Non-filled orders (BUY)

The Cancel and Filled Order Size Ratios (PCF) category includes four sub-metrics that calculate the ratio of cancelled and filled orders to placed orders in both buy and sell sides. The cancelled order is an order which was previously placed but then withdrawn.
1) Total Canceled vs Placed orders (BUY)
2) Total Filled vs Placed orders (BUY)
3) Total Canceled vs Placed orders (SELL)
4) Total Filled vs Place order in (SELL)

The Gross Filled Order Size Ratios (GRF) category includes two ratios and both buy and sell sides.
1) Total Filled orders versus Non-Filled orders (BUY)
2) Total Filled orders versus Non-Filled orders (SELL)

These ratio metrics may be further normalized such that two sigma values (two standard deviations from an average) represent unity. For instance, if a given sample's numerical value of a ratio is two standard deviations from an average, the result of the normalization process will be equal to one.

Thus, feature extraction engines 116 and 136 can be configured to read training clusters 112 and trading clusters 132 respectively from buffers 114 and 134 respectively and compute a set of features for each cluster. The resulting cluster features (e.g., training cluster features 118 and trading cluster features 138) can take the form of a vector of values that describe the cluster for purposes of training or spoofing evaluation. Feature extraction engine 116 feeds these computed training cluster features 118 into the machine-learning classification engine 120, and feature extraction engine 136 feeds these computed trading cluster features 128 into the classifier engine 140.

Machine-Learning Classification—Training and Execution

Machine-learning classification engine 120 processes incoming training cluster features 118 (where these features are associated with a label indicative of a spoofing classification (e.g., positive, negative, or unlabeled)) and employs machine-learning algorithms to train classification model 122.

Examples of machine-learning classification techniques that could be employed by engine 120 include logistic regression, random forest, support vector machines (SVM), and neural networks (or combinations thereof). The choice as to which classification techniques are used can vary as a function of the nature of the training data being used. For example, SVM may be preferable when the amount of positively labeled training data is small and the features of the clusters may be non-linear. As another example, logistic regression may be preferable when it is desired that the trained classification model weigh certain features in the training data more heavily than other features.

In the example embodiment discussed herein for purposes of elaboration, the training classification operation will be performed with respect to incoming training cluster features that are positively labeled and unlabeled. To facilitate the training of model 122, the machine-learning classification engine 120 can draw on the learning techniques for positively labeled (P) and unlabeled (U) data described by Bing Liu et al. at the URL www.cs.uic.edu/~liub/NSF/PSC-IIS-0307239.html as "Learning from Positive and Unlabeled Examples" (see also Bing Liu, Yang Dai, Xiaoli Li, Wee Sun Lee and Philip Yu. "Building Text Classifiers Using Positive and Unlabeled Examples." *Proceedings of the Third IEEE International Conference on Data Mining (ICDM-*03), Melbourne, Florida, November 19-22, 2003, the entire disclosure of which is incorporated herein by reference).

Figure 4:
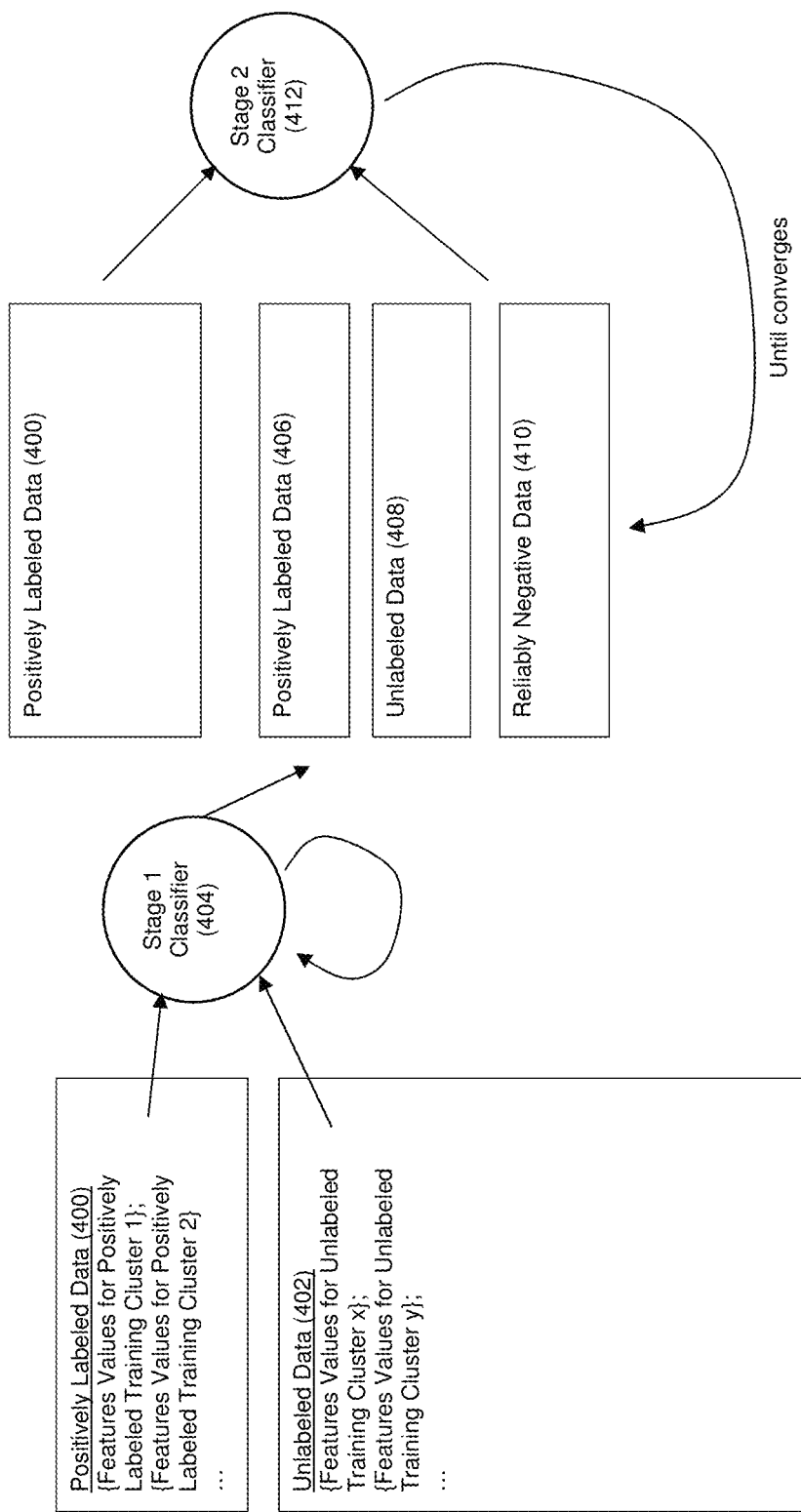
FIG. 4 illustrates an example embodiment of a machine-learning classification engine for use by a training system.

FIG. 4 depicts an example embodiment for the machine-learning classification engine 120. As shown by FIG. 4, an example embodiment of the machine-learning classification engine 120 employs two stages of classification (see Stage 1 classifier 404 and Stage 2 classifier 412). The Stage 1 classifier 404 is configured to process positive data 400 and unlabeled data 402 to extract a population of reliably negative data 410 from the unlabeled data 402. Thus, the Stage 1 classifier 404 operates to identify a subset of the unlabeled data 402 that is reliably negative based on comparisons of the unlabeled data 402 with the positive data 400. Other subsets of the unlabeled data 402 might be labeled by the Stage 1 classifier 404 as positive data 406 while other subsets might remain as unlabeled data 408.

The Stage 2 classifier 412 then uses the positive data 400 (and optionally positive data 406) and the reliably negative data 410 to train a plurality of classification models that get tested as to how reliably they predict positive and negative data. This training and testing by the Stage 2 classifier models are iteratively repeated until the models converge with respect to how they predict the negative data.

The Stage 1 and Stage 2 classifiers can employ any of a number of classification techniques. For example, in an example embodiment, the Stage 1 classifier 404 can employ Naïve Bayesian (NB) classification (or some other type of probabilistic classification) while the Stage 2 classifier 412 can employ SVM classification (e.g., running SVM iteratively with classifier selection). As another example, in an example embodiment, the Stage 1 classifier 404 can employ NB classification while the Stage 2 classifier 412 can employ distributed random forest (DRF) classification. Other examples for Stage 2 classification may include gradient boosting method (GBM) and generalized linear estimation (GLE).

At stage 1, the NB classifier applies Bayes' theorem with strong (naive) independence assumptions between features. In the embodiment, the NB classifier is used to process positively labeled and unlabeled data in the first stage. Using the positive and unlabeled data set, the NB classifier is used to guess a subset of the unlabeled data that can be reliably labeled as negative data.

The initial guess from stage 1 is used to seed the training of a stage 2 classifier 412. For the stage 2 classifier, a Distributed Random Forest (DRF) Model can be used. The stage 2 classifier 412 is retrained and retested on the data until the subset of data labeled negative has converged. By changing the type of and parameters defining the stage 2 classifier 412, a large number of converged trained classification models are generated. Examples of parameters that can changed to generate different trained DRF models include number of trees, tree depth, and the method for sampling the positive and unlabeled data. For other model types, the parameter list would differ. A single best model is selected from the set of trained models by defining a selection mechanism composed of multiple measures.

Measures for selecting a best model can assess the performance of a trained classification model by evaluating its performance with respect to classifying a validation or test set of data composed of positively labeled and unlabeled examples. Each model maps each cluster in the validation or test set of data to a score ranging from zero to one. Additionally each model is paired with a threshold. Clusters scored above the threshold are predicted positive. Clusters scored below the threshold are predicted negative. An example measure for a model is the recall of known positives, i.e. the fraction of known positive data predicted to be positive. Another example includes a measure that, when maximized, minimizes the additional unknown data predicted to be positive, i.e. the fraction of the predicted positive clusters that are known positives. A third measure combines these two measures into a single measure by calculating their harmonic mean, thus representing a tradeoff between two primary measures. A fourth measure combines the first two measures using a weighted harmonic mean so that its optimization prioritizes maximizing one measure (e.g. the correct labeling of the known positive data) over the other (e.g, minimizing labeling unknown data as positive).

A selection mechanism may also include measures of the stability of a model. For example, model stability can be measured using the mean predicted probability difference (MPPD), which measures how much the prediction of the model changes if a different sampling of the positive and unlabeled data set is used to train the model. MPPD provides a sense of how stable the risk score is, or conversely, whether a given trained model has overfitted the data set.

A selection mechanism may also specify the sensitivity of the score generated by the model with respect to the known positively labeled data. For example, a model that mapped all the known positive data to values between 0.99 and 1.0 cannot differentiate between the different degrees of spoofing between different clusters. It is insensitive to the positively labeled data. The sensitivity of model to the known positive data can be achieved by requiring the score threshold have an optimal value close to 0.5 while maximizing other measures.

Thus, each model can be associated with a set of metrics that describes various characteristics of the model with respect to how the model classifies validation and test data and the model's stability. A practitioner can then devise a selection mechanism that uses a combination of these metrics that govern which model is selected as the trained classification model 122. For example, the selection mechanism can specify a minimally acceptable recall of known positives. Another selection mechanism may seek a model where the MPPD is less than 1% and a weighted harmonic mean is maximized, but the scoring threshold is approximately 0.5. The model that optimizes the selection criterion is selected as the trained classification model 122 for use by the classifier engine 140.

The trained classification model 122 can take the form of plurality of parameters or coefficients that describe the model 122 to classifier engine 140. Classifier engine 140 within the execution system 106 accesses the trained classification model 122 to parameterize a classification algorithm that will assign a classification status to trading clusters based on an analysis of the trading cluster features 138 for those trading clusters. The trained classification model 122 may be provided to the classifier engine 140 in a variety of ways. In one example, the trained classification model 122 may be provided via an electronic file transfer from the training system 104. Thus electronic file transfer is possible when the execution system 106 and training system 104 are communicatively coupled as shown in FIG. 1. In another example, the trained classification model 122 may be provided via a physical installation on the execution system 106. For example, the trained classification model 122 may be transferred from the training system 104 to the execution system 106 via a storage media such as a CD, USB, or DVD, or hard drive.

While FIG. 4 shows a two-stage approach to the machine-learning classification engine 120 for training the classification model, it should be understood that practitioners may choose to employ different machine-learning techniques with the machine-learning classification engine 120. For example, a single stage machine-learning classification engine 120 could be employed.

The classifier engine 140 processes the trading cluster features 138 for a given trading cluster using a classification algorithm parameterized in accordance with the model 122 to compute a classification score that serves as a measure of probability as to whether the subject trading cluster qualifies as trade spoofing (based on a similarity of the trading cluster features 138 to positively labeled training cluster features 118). The classifier engine is a mathematical function created by the model training algorithm. The input to the function is the feature values of a cluster. Evaluating the function is a straight-forward computation. The output of the function is a value between 0 and 1 (e.g., 0.587) where the closer to 1 the more likely it is that the trading cluster represents trade spoofing while the closer to zero the more likely it is that the trading cluster does not represent spoofing. This classification score serves as the trading cluster classification data 142 that is associated with each trading cluster 132. It should also be understood that the classification score can be a more binary "0" or "1" if desired by a practitioner, although the more granular values for the classification score allow for more meaningful risk information to be communicated to auditors so that auditing workload can be prioritized on the highest risk scores.

Figure 5:
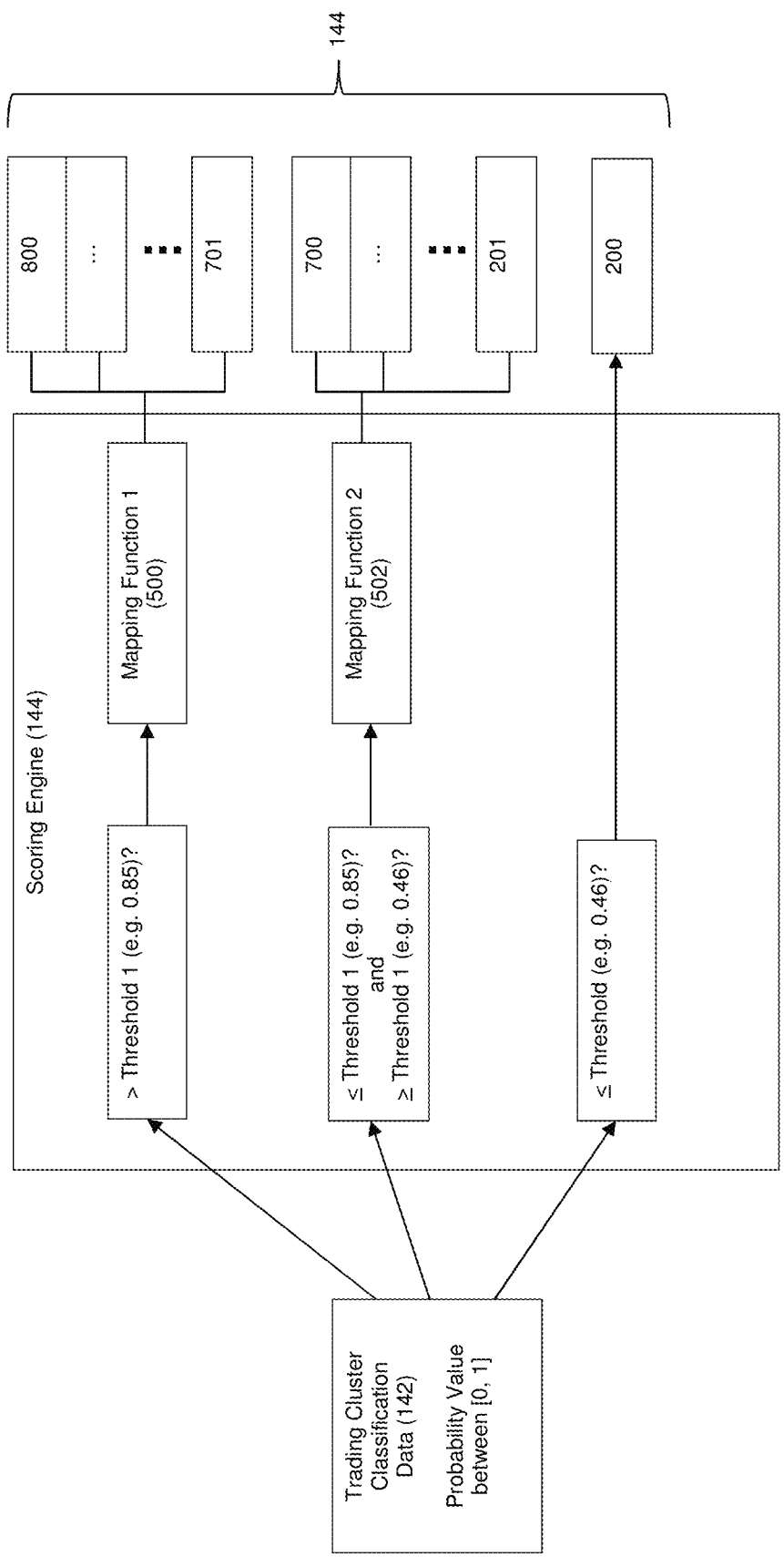
FIG. 5 illustrates an example embodiment of a scoring engine.

A scoring engine 144 may optionally be employed to transform the trading cluster classification data into a trading cluster risk score that is scaled to a value within a defined range of values. For example, the scoring engine 144 can employ a transform as shown by FIG. 5 to translate cluster classification data 142 into trading cluster risk scores 146. For example, a trading cluster with a classification score above a first defined threshold has its value scaled to a value between 701-800 in a range of risk scores between 200-800 according to a defined first score mapping function 500. A trading cluster with a classification score below a second defined threshold is assigned the lowest value in the defined range (e.g., a value of 200 in this example) to identify that cluster as not being deemed a spoofing risk. A trading cluster with a classification score between the first and second thresholds has its value scaled to a value between 201-700 according to a defined second score mapping function 502. For example, this scoring mapping functions 500 and 502 can employ a linear or other mapping of classification scores to a corresponding value in the relevant risk score ranges. Thus, each trading cluster can be associated with a trading cluster risk score 146 that exhibits a value easily understood by an auditor as to its risk of qualifying as trade spoofing. For example, a trading cluster with a risk score of 750 can quickly be identified as being at a high risk of spoofing while a trading cluster with a risk score of 300 can be quickly identified (relatively speaking) as a lower risk. It should be understood that the risk score range of 200-800 is an example only, and a practitioner may choose to employ different risk score ranges.

As the execution system 106 processes numerous trading clusters 132 for numerous traders, it can build a database of trading clusters for various traders, where each trading cluster is associated with a trading cluster risk score 146 to identify its risk of qualifying as trade spoofing. This database can then be mined by auditors in any of a number of ways to audit and monitor the trading behavior of traders.

Figure 6:
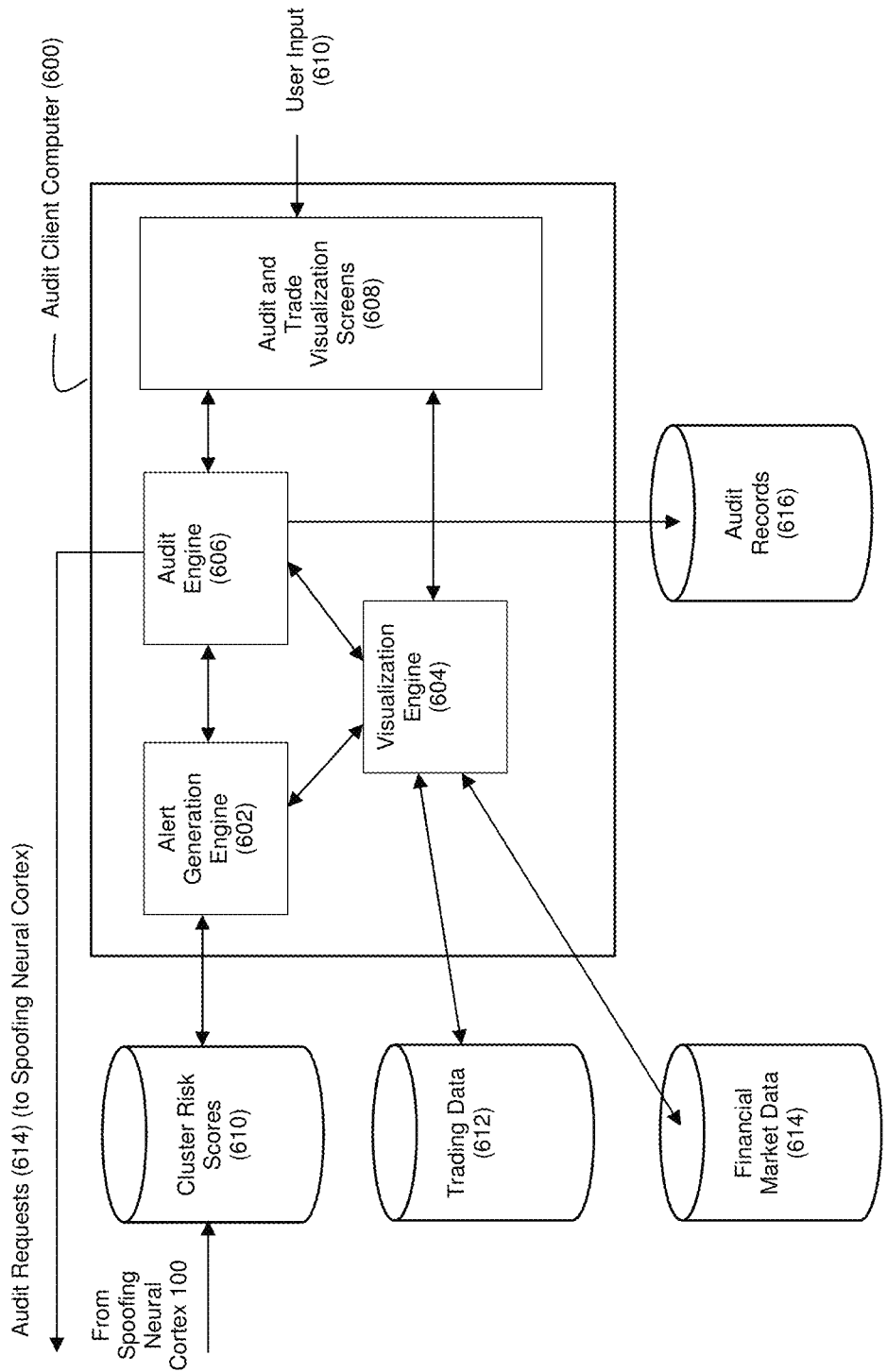
FIG. 6 illustrates an example embodiment of an audit client computer.

FIG. 6 depicts an example configuration for an audit client computer 600 that accesses a database of cluster risk scores 610 to facilitate evaluation by an auditor of potential trading spoofing activities by traders. In addition to accessing database 610, the audit computer 600 may also have access to additional databases, such as databases of trading data 612, databases of financial market data 614, and databases of audit records 616. The audit client computer 600 may be any type of computer system having a processor, memory, user interface, and a graphical interface to display a graphical user interface (GUI).

The audit client computer 600 includes an alert generation engine 602 that can be configured to generate an alert when a new cluster risk score is added to database 610. This alert can be passed to an audit engine 606 and visualization engine 604 which interact with audit and trade visualization screens 608 for presentation as GUIs to a user.

For example, through an audit and trade visualization screen 608, a user can review a list of trading clusters whose risk scores resulted in the generation of an alert. The audit engine 606 and visualization engine 604 can cooperate to present these risk scores in combination with additional metadata that will help the user further evaluate the trading activity described by the risk score to assess whether trade spoofing may have occurred. Examples of GUI screens to facilitate these operations are shown and described in the above-referenced and incorporate parent provisional patent applications. For example, a list of alerts can be presented via GUI screen. As another example, a tiled heat map of trading clusters and their associated risk scores can be presented. A user can review the metadata relating to these alerts and risk scores and provide input 610 that tags the alert/risk score as either being dismissed as not a spoofing risk (e.g., an investigation by the user revealed that the trader in question was executing a permissible trading strategy as opposed to spoofing with respect to the high risk trading cluster) or flagged for further investigation. The audit records database 616 can be updated based on this input such that high risk trading clusters get associated with information from the user entered through the GUIs 608.

Also, the user can provide input 610 through a GUI screen 608 that causes the audit engine 606 to generate an audit request 614 for delivery to the spoofing neural cortex 100. For example, the user may request that a particular trader's trading activities for the past two weeks with respect to a specified financial instrument in a specified financial market be evaluated by the spoofing neural cortex 100 for potential trade spoofing.

Another capability of the visualization engine 604 is to correlate trading cluster data and risk scores with financial market data 614. Thus, a trader's trading activities in a trading cluster can be evaluated against the state of the market at the times in question. One or more GUIs 608 can provide a "replay" functionality that plots a trader's trading activity against views of an order book for the financial instrument in question during the time period in question for a trading cluster. Such a display can provide the user with useful context for better understanding a trader's actions. Examples of such GUI screens are shown and described in the above-referenced and incorporate parent provisional patent applications.

While FIG. 6 shows various processing components being deployed on the audit client computer 600, it should be understood that one or more of these components could be deployed on a server for access by the audit client computer 600 via a network (e.g., access via a browser or the like). For example, a server could include the alert generation engine 602, the visualization engine 604, and the audit engine 606, and the client computer 608 could access these components and the GUI screens 608 through a browser or the like.

While FIG. 1 describes an example embodiment for a spoofing neural cortex 100, it should be understood that other example embodiments may employ alternate designs or modify certain features.

Figure 7:
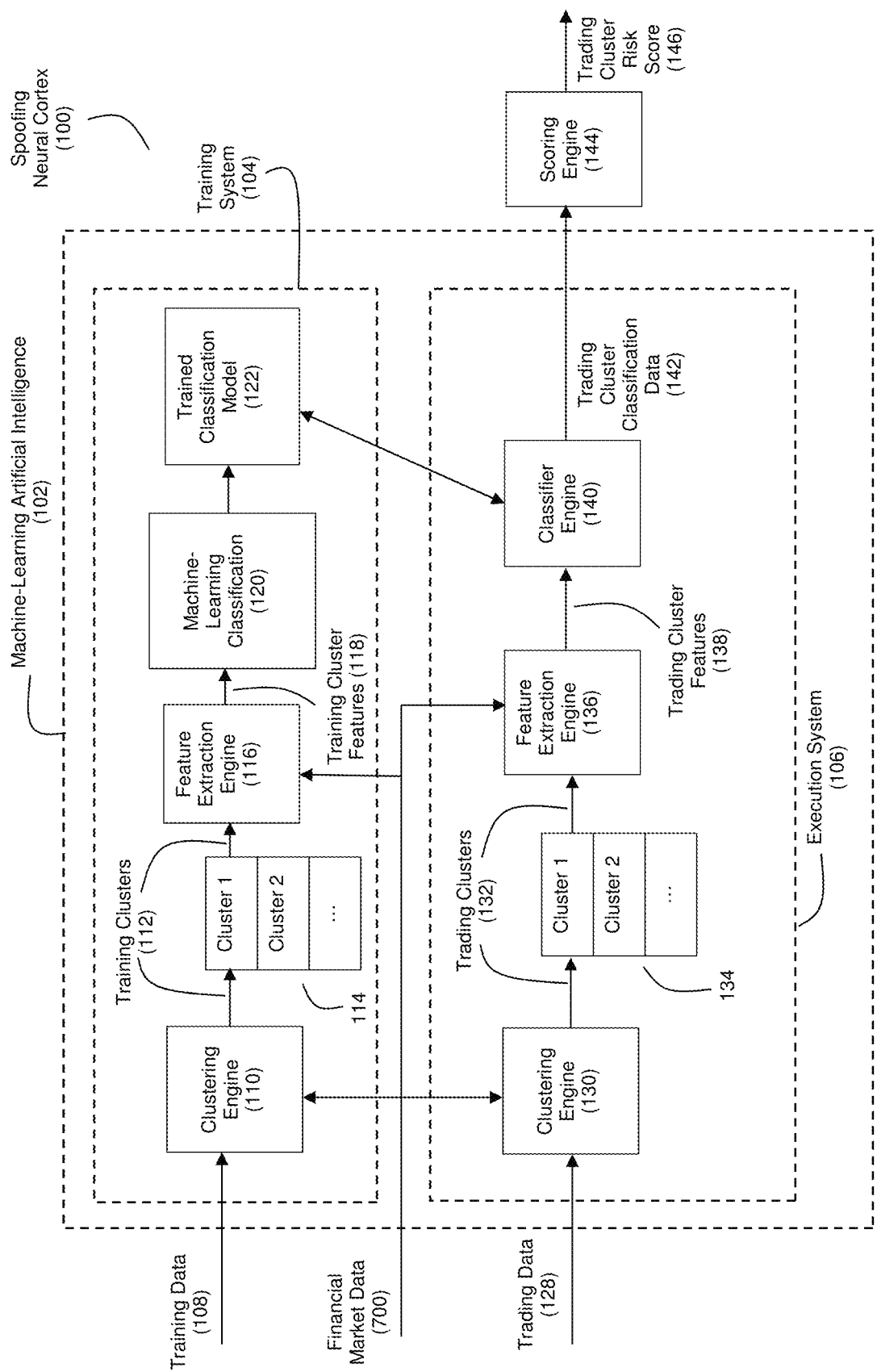
FIG. 7 illustrates a system diagram of another example embodiment of a spoofing neural cortex.

For example, FIG. 7 shows another example spoofing neural cortex 100 where financial market data 700 is used by one or both of the clustering engines and feature extraction engines. Thus, the training and trading clusters can be correlated with financial market data that describes the state of the market as it existed in time context with respect to the training and trading clusters. Further still, the feature extraction engines might employ this financial market data 700 to compute various features for each cluster. For example, a practitioner might find is useful to compute a feature for a cluster that measures a percentage of the overall volume of orders for a given financial instrument in the subject financial market were made up by the subject trader's orders. To compute such a feature, the feature extraction engines would need access to the financial market data 700 as it existed during the time period in question As another example of a modified design, the spoofing neural cortex can be deployed on highly parallelized computing resources such as a cloud computing platform to improve performance and support real-time assessments as to whether trading activities by traders are at risk of being deemed trade spoofing. For example, the spoofing neural cortex 100 could be deployed on the H2O cloud platform where different compute resources within the platform would operate in parallel during training and execution.

Further still, to support real-time operation, the spoofing neural cortex could compute running risk scores for trading clusters as they are being formed in real-time. FIG. 8 shows how a running classification score 142 (and/or risk score 146) can be computed for a trading cluster while the trading cluster is still "open" (i.e., before there has been a sufficient lull in trading activity for the burst interval time parameter to have been satisfied between consecutive trade events). Each time a new trading event is added to the cluster, there is a new invocation of the feature extraction engine 136 with respect to the updated "open" trading cluster, which in turn drives a new classification effort by the classifier engine 140 to compute a running "preliminary" classification score 142 (and/or risk score 146). As mentioned above, the feature extraction engine 136 and classifier engine 140 can be deployed across highly parallelized compute resources so that the system can keep up with the computational demand. When the trading cluster finally "closes" (see the dashed line in FIG. 8 corresponding labeled "cluster ends"), the classification score 142 (and/or risk score 146) at that time becomes the final classification score 142 (and/or risk score 146) for that trading cluster.

The ability to compute classification scores 142 (and/or risk scores 146) for open trading clusters in real-time provides auditors and risk management personnel with powerful capabilities for mitigating risk. For example, if any of the real-time preliminary classification scores 142 (and/or risk scores 146) exceed a defined threshold or shows a rate of change of increasing risk beyond a threshold, real-time alerts can be communicated to management. Based on the presented risk, management could make decisions to halt the subject trading by the subject trader in near real-time (e.g., via a "kill switch" or the like that may be built into the trading platform used by the subject trader) or otherwise communicate with the trader to change the trader's trading activities in a manner that reduces spoofing risk.

Also, while the example embodiment of machine-learning artificial intelligence shown by FIGS. 1 and 7 can be employed to detect trade spoofing, it should be understood that this architecture could also be employed to detect other types of undesirable trading behaviors. Examples of such trading behaviors that could be detected by the machine-learning artificial intelligence architecture of FIGS. 1 and 7 include, but are not limited to, quote stuffing, microburst quote stuffing, malfunctioning algos, spoofing coupled with layering, market flipping, collapsing of layers, spread squeezes, momentum ignition, pinging, phishing, opening/closing period manipulation, disruptive/abusive messaging, suspicious price movements, wash trading, churning, and cross trading. To configure a neural cortex to detect such activities, one would need a sufficient sample of positively labeled training data and unlabeled training data for each type of behavior so that a classification model could be trained to reliably score trading data as to its similarity with respect to such behavior. Further still, it should be understood that different neural cortexes configured to detect different kinds of improper trading behavior may be deployed in parallel across parallelized compute resources so that the system can assess the risk of a given set of trading data exhibiting any of multiple types of improper trading behavior (for example, a spoofing neural cortex operating in parallel with a quote stuffing neural cortex and a momentum ignition neural cortex.

Thus, it should be appreciated that while the invention has been described above in relation to its example embodiments, various modifications may be made thereto that still fall within the invention's scope. Such modifications to the invention will be recognizable upon review of the teachings herein.

The invention claimed is:

1. A method including:
receiving, by a computer system, trading data, wherein the trading data includes a plurality of time-stamped trade events with respect to a financial instrument in a financial market;
grouping, by the computer system, trade events in the trading data into a plurality of trading clusters by time proximity according to a burst interval time parameter such that consecutive trade events that differ in time by less than the burst interval time parameter are grouped in the same trading cluster and further such that consecutive trade events that differ in time by more than the burst interval time parameter are grouped in different trading clusters;
applying, by the computer system, data that represents each trading cluster of the plurality of the trading clusters to a trained classification model data structure to determine a spoofing classification status for each applied trading cluster, wherein the trained classification model data structure was created in response to the application of a machine-learning artificial intelligence to training data, wherein the spoofing classification status indicates a likelihood that the applied trading cluster describes trade spoofing in the financial market;
computing, by the computer system, a spoofing risk score for each trading cluster of the plurality of the trading clusters based on the determined spoofing classification status for each respective trading cluster;
determining, by the computer system, the computed spoofing risk score exceeds a threshold; and
automatically triggering, by the computer system, in response to determining the computed spoofing risk score exceeds the threshold, a kill switch in a trading platform used by a trader associated with the trade events of the corresponding trading cluster, wherein the kill switch halts trading by the trader in the trading platform.

2. The method of claim 1, wherein the computer system includes a plurality of processors that are part of a distributed computing architecture, wherein the plurality of processors perform the grouping, the applying, the computing, the comparing, and the generating in parallel.

3. The method of claim 1, wherein grouping the trade events further includes, for each of a plurality of the trading clusters, including a plurality of trade events in that trading cluster that relate to the same orders that are subjects of the trade events that had been grouped into that trading cluster based on the burst interval time parameter.

4. The method of claim 1, wherein the burst interval time parameter includes a static value.

5. The method of claim 1, further including:
dynamically computing, by the computer system, the burst interval time parameter as a function of at least one member of the group of: (1) the trading data and (2) financial market data relating to the trading data.

6. The method of claim 1, wherein the trading data within each of a plurality of the trading clusters is specific to a member of the group of: (1) trades by a single trader with respect to one or more financial instruments, (2) trades by a single trading account with respect to one or more financial instruments, (3) trades by a specified group of traders with respect to one or more financial instruments, and (4) trades by a specified group of trading accounts with respect to one or more financial instruments.

7. The method of claim 1, further including:
computing, by the computer system, a plurality of values for a plurality of features with respect to each of a plurality of the trading clusters, wherein the computed feature values serve as the applied data that represents the trading clusters.

8. The method of claim 7, wherein at least one feature of the plurality of features includes a value representing a comparative ratio of the trading data.

9. The method of claim 8, wherein the plurality of the features further includes at least two members of the group of: (1) a value relating to market context, (2) a measurement of a trading book imbalance, (3) a measurement of concealing market interest, and (4) a measurement of rapid addition or removal of order volume from a top of a trading book.

10. The method of claim 8, wherein the comparative ratio includes at least one member of the group of: (1) a ratio of an average order size of non-filled orders to an average order size of filled orders, (2) a ratio of the average order size of filled orders to the average order size of non-filled orders, (3) a ratio of (i) a ratio of orders placed versus orders canceled to (ii) a ratio of orders placed versus orders filled, and (4) a gross ratio of filled orders versus non-filled orders.

11. The method of claim 10,
wherein the ratio of the average order size of non-filled orders to the average order size of filled orders further includes at least one sub-metric calculated by at least one of: (1) an average order size of non-filled buy orders versus filled buy orders, (2) an average order size of non-filled sell orders versus filled sell orders, (3) an average order size of non-filled buy orders versus filled sell orders, and (4) an average order size of non-filled sell orders versus filled buy orders;
wherein the ratio of the average order size of filled orders to the average order size of non-filled orders further includes at least one sub-metric calculated by at least one of: (1) a total amount of filled buy orders versus non-filled buy orders, (2) a total amount of filled sell orders versus non-filled sell orders, (3) a total amount of filled buy orders versus non-filled sell orders, and (4) a total amount of filled sell orders versus non-filled buy orders;
wherein the ratio of (i) the ratio of orders placed versus orders canceled to (ii) the ratio of orders placed versus orders filled further includes at least one sub-metric calculated by at least one of: (1) a total amount of canceled buy orders versus placed buy orders, (2) a total amount of filled buy orders versus placed buy orders, (3) a total amount of canceled sell orders versus placed sell orders, and (4) a total amount of filed sell orders versus placed sell orders; and
wherein the gross ratio of filled orders versus non-filled orders further includes at least one sub-metric calculated by at least one of: (1) a total amount of filled buy orders versus non-filled buy orders, and (2) a total amount of filled sell orders versus non-filled sell orders.

12. The method of claim 1, wherein the application of the machine-learning artificial intelligence to the training data includes applying semi-supervised machine-learning classification to the training data.

13. The method of claim 12, wherein the semi-supervised machine-learning classification includes two-stage machine-learning classification.

14. The method of claim 1, wherein the training data includes positively labeled training data, wherein the positively labeled training data includes a plurality of clusters of trading data that are classified as indicative of trade spoofing in a financial market.

15. The method of claim 1, wherein the training data includes unlabeled training data, wherein the unlabeled training data includes a plurality of clusters of trading data that are unclassified as to whether they are indicative of trade spoofing in a financial market.

16. The method of claim 1, wherein the training data further includes negatively labeled training data, wherein the negatively labeled training data includes a plurality of clusters of trading data that are classified as not being indicative of trade spoofing in a financial market.

17. The method of claim 1, wherein the grouping, the applying, the computing, the comparing, and the generating are performed in real-time as new trading data is received.

18. The method of claim 1, wherein the distributed computing architecture includes a cloud computing platform, wherein the cloud computing platform operates in real-time as trading clusters are formed.

19. The method of claim 1, further comprising, prior to applying the data that represents each trading cluster of the plurality of the trading clusters to the trained classification model data structure to determine the spoofing classification status for each applied trading cluster, discarding clusters of the plurality of trading clusters that include less than a threshold number of trade events.

20. The method of claim 1, further comprising:
repeatedly applying, by the computer system, the machine-learning artificial intelligence over time with respect to additional sets of training data to update the trained classification model data structure.

* * * * *